United States Patent [19]

Pinon et al.

[11] Patent Number: 5,094,864
[45] Date of Patent: Mar. 10, 1992

[54] METHOD FOR PREPARING FOOD PRODUCTS FOR LONG-TERM PRESERVATION

[75] Inventors: Daniel J. Pinon, Jonchery sur Vesle; Gérard M. Alcaraz, Saint Apollinaire, both of France

[73] Assignee: Union Pour le Commerce, le Financement et les Etudes (U.C.F.E.), Paris, France

[21] Appl. No.: 396,241

[22] Filed: Aug. 21, 1989

Related U.S. Application Data

[63] Continuation-in-part of Ser. No. 257,192, Oct. 12, 1988, abandoned, which is a continuation of Ser. No. 936,507, Dec. 1, 1986, abandoned.

Foreign Application Priority Data

Nov. 29, 1985 [FR] France .................. 85 17659

[51] Int. Cl.⁵ ............................................. A23B 4/00
[52] U.S. Cl. ...................................... 426/233; 426/521; 426/523
[58] Field of Search ..................... 426/233, 521, 523

[56] References Cited

U.S. PATENT DOCUMENTS 4,212,894 7/1980 Franzen et al. ............... 426/521

Primary Examiner—George Yeung
Attorney, Agent, or Firm—Cushman, Darby & Cushman

[57] ABSTRACT

A process for preparing a dish of cooked foodstuff product, which process comprises the steps of (a) measuring the pH of the product, (b) determining the oxidoreduction potential E of the product, (c) calculating the $rH_2$ value of the product using Nernst formula: $rH_2 = 2pH + 33.33E$, (d) determining whether the cooked dish is reductive, neutral or oxidative where the pH and $rH_2$ have been determined by reference to the position of the cooked dish relative to a curve $rH_2 = f(pH)$ of the drawing, (e) determining a pasteurization value from the results of step (d) to determine a cooking temperature range that is below a 100° C. for the product by varying at least one of the pH of the product while maintaining the pH above 4.5 and the ratio of free water to total water of the product while maintaining the cooking temperature range in excess of the minimum lethal temperature necessary to destroy streptococci D and subjecting the product to a heat treatment for a time selected to attain but not exceed the cooking value and to at least attain the pasteurization value, and thereafter lowering the temperature of the product to cool the product to a temperature above 0° C.

4 Claims, 1 Drawing Sheet

METHOD FOR PREPARING FOOD PRODUCTS FOR LONG-TERM PRESERVATION

This is a continuation-in-part of application Ser. No. 07/257,192, filed Oct. 12, 1988, which is a continuation of application Ser. No. 06/936,507, filed Dec. 1, 1986, both of which are now abandoned.

FIELD OF THE INVENTION

The present invention relates to a method for preparing food products, which includes a heat treatment and is intended to assure their long-term preservation, particularly if the prepared food products are stored at above-zero cold (between +3° and +5° C.), without deterioration of the organoleptic characteristics and qualities and especially taste compared with the corresponding fresh food products, that is, the same food products not having undergone heat treatment except that needed for their preparation.

BACKGROUND OF THE INVENTION

To permit long-term preservation of food products, various different methods, such as canning or sterilization, pasteurization, deep-freezing, ionization by irradiation, and lyophilization, are well known at present.

Sterilization is a preservation method that in its conventional form breaks down the processed food products on the organoleptic level and in particular affects their taste and appearance. Because of this, it does not enable the manufacture or preparation of top-quality products. Consequently, the method is not used on a large scale except for processing food products that are not initially top quality products.

Deep-freezing is a preservation method that also causes irreversible physical-chemical degradation in the processed products, particularly affecting the proteins and starch that they contain, because the processed products are exposed to below-zero cold. For this reason, this method is again not used except to prepare products that are not of top quality.

Refrigeration is a satisfactory preservation method from the organoleptic standpoint, even though the storage life of refrigerated food products is quite short. However, this method has the disadvantage of not disrupting microbial or enzymatic activity. In particular, the spores of Clostridium botulinum type E, which among microorganisms present in food products are the most dangerous for the human organism, can germinate under certain temperature conditions which are encountered in preservation at above-zero cold, in particular as soon as the the temperature rises above 2.2° C.; and beginning at +3° C., the germinated spores can grow.

Lyophilization is a preservation method which is quite tedious to use, and moreover it is again reserved for food products or primary materials that are not of high quality.

Preservation of fresh food products at above-zero cold and in a vacuum is a method that does slow down or stop the development of the majority of aerobic microbial flora. In certain cases, however (elevated pH, elevated microbial burden, insufficient lactic flora), it can promote the germination and growth of the most dangerous microorganisms (Clostridium botulinum) and additionally can permit the formation of zones, in the form of exudates and substrates, that are particularly favorable to the development of all bacteria, whether strictly or only selectively anaerobic.

Finally, ionizing irradiation is authorized only for certain products, at irradiation doses such that they reduce but do not completely destroy the microbial burden. Moreover, sterilizing doses, which degrade the food products, are dangerous to public health and are authorized only for the packages themselves. Another disadvantage of this preservation method is that the irradiation apparatus is extremely expensive. Known preservation methods hence have the common disadvantage that none of them allows the simultaneous assurance of complete microbiological safety, respecting the initial organoleptic, nutritional and rheological quality and characteristics of the processed food products, while being usable for a very wide range of food products, and finally being usable without major capital investment.

SUMMARY OF THE INVENTION

The object of the invention is to propose a method to prepare food products that permits long-term preservation of these products, while offering the advantages of each of the known preservation methods described above and overcoming their common disadvantage. The investment in equipment for performing the method according to the invention is no higher than that required for the other preservation techniques, because the method according to the invention includes a heat or cooking treatment that can be performed with the aid of simple equipment at low cost.

Hence the object of the invention is to propose a method for processing the food products that permits their long-term preservation while respecting their organoleptic, nutritional and rheological qualities and being adapted to the characteristics of each food product processed individually.

In other words, the object of the invention is to propose a method for processing food products, with a view to assuring their long-term preservation, which has great flexibility in adaptation to the inherent requirements for each processed food product, as a function of not only the nature and fragility of the primary material but also its wrapping and industrial requirements for preparing and packaging it. Naturally, the prepared product must be stable, and must have the most faithful possible resemblance to the initial product, in terms of its organoleptic, nutritional and rheological qualities and in particular its taste.

The principle on which the method of the invention is based comprises assuring total safety on the microbiological level, by destroying the streptococci D that are potentially present in the food products using means substantially similar to those of pasteurization, and consequently destroying all the less heat-resistant vegetative forms, and simultaneously neutralizing the microorganisms in sporulated form, yet without destroying all of them, which would necessitate recourse to sterilization, with attendant damage to both the appearance and taste of the products, as has already been explained above.

To arrive at this neutralization of the microorganisms in sporulated form, the principle on which the invention is based comprises creating physical-chemical conditions under which these microorganisms cannot germinate and develop, using the most dangerous microorganism, Clostridium botulinum, as the reference.

As for the vegetative microorganisms, it is commonly agreed that they are destroyed to a satisfactory extent when the number of streptococci D, which are the most resistant to heat, has been brought at the end of the heat treatment to a value of $10^0$ per unit of volume, beginning with a theoretical burden of $10^{20}$. To assure the destruction of the streptococci D, it is known to subject a food product to be prepared to a heat treatment, the duration and temperature of heating of which are such that as a function of the pH and the rH, at least a particular value, known as pasteurization value P, which is expressed in points, is attained. For example if the pH is 6.3 and the $rH_2$ is 16.5 for destroying the streptococci D, then a pasteurization value P of 40 points must be attained.

Once the cooking curve of the product is known, that is, curve of temperature development in cooking to the center of the product as a function of time, and one the pH and $rH_2$ are known, the pasteurization value attained can be calculated, as the sum of the points obtained at the ends of successive minutes of cooking, taking into account the temperatures of heating to the center in the course of these minutes.

Conversely, if the pasteurization value P to be attained for a product of a given pH and $rH_2$ is known, then the cooking curve can be determined, and in particular the maximum temperature, or the minimum and maximum temperatures, and the time for holding at this temperature or for development between these temperatures can be selected, to be sure that the pasteurization value P will indeed be attained at the end of cooking. In that case, one should not forget to take into account the points acquired in the course of possible prior cooking or initial heating phases which the processed product has undergone.

Moreover, it is known that if the pH of the processed product decreases, then the pasteurization, for a given $rH_2$, is more rapid, such that the pasteurization value P will be attained at shorter durations and lower cooking temperatures.

It is additionally known for a certain value, known as a cooking value, to be used to express the cooking that a food product must undergo for the product to "taste right". The term "cooking" is intended to include all the various successive cooking or heat treatments that the product undergoes. Heating of a given product for one minute at a given temperature corresponds to a certain cooking value or cooking quantity supplied to the product, and this corresponds to the area, for this minute of heating, delimited between the cooking curve (temperature as a function of time) and the time axis. For a particular food product to have the best gustatory, nutritional and rheological quality after cooking, an optimal cooking area value for the product must be attained, but not exceeded, at the end of cooking. This optimal value of the cooking area, known as the cooking value, is peculiar to each product to be processed and may be derived or obtained at the end of a very large number of different cooking curves.

In the light of the above, one particular characteristic of the method according to the invention comprises determining the particular cooking value for a food product to be processed, then determining a cooking curve at the end of which the cooking value is attained without being exceeded, moreover determining the pasteurization value of the product beginning with the measurement of its pH and $rH_2$, and verifying that when the cooking value has been attained the pasteurization value has also at least been attained and preferably exceeded, and if this is not the case, modifying the pH and/or $rH_2$ value of the product, and optionally, the maximum temperature of the cooking curve, such that at the end of this cooking curve, the cooking value is attained after having exceeded the pasteurization value. Certitude is thus achieved that on the one hand the product is cooked just to the point where its taste will be best, and on the other hand, the streptococci D are destroyed, and hence all vegetative forms have been destroyed.

However, it is still necessary, simultaneously, to neutralize the microorganisms in the sporulated state, and in particular the Clostridium botulinum which is potentially present in the processed food product.

To this end, it is known that if canning or sterilization of the product is performed, that is, if the product is rapidly brought to an elevated temperature, certain microorganisms adopt a defense posture by sporulating, but they resume their development as soon as the temperature and/or environmental conditions have once again become favorable for them. Moreover, it is agreed that a food product is defined as being in a commercially sterile state when at the end of heat treatment the number of Clostridium botulinum germs has been reduced from $10^{12}$ to $10^0$. This is obtained for example, for a product of pH 6.5 and $rH_2$ 18, if the temperature at the center is kept at 121.1° C. for 2.52 minutes, while if the pH of the product is only 4.5 and its $rH_2$ is 18, the same result is obtained by holding it at a temperature of 85° C. for only 2 minutes. It is also known that the microorganisms that have sporulated cannot germinate except in the presence of free water in the environment. The ratio between the free water and the total water (the sum of the free water and the bound water) in the product has been defined as AW (standing for the term in English, "activity water"), which varies between 0 and 1, and it is known that for a pH of 6.5 and a $rH_2$ of 18, these spores of Clostridium botulinum are inhibited when AW is less than 0.91, and that as a function of the pH and the $rH_2$, the inhibition value of the AW ratio evolves in accordance with known curves defining a zone of stable germination at a temperature below $+2°$ C., a zone of total inhibition, and an intermediate inhibition zone which is stable at a temperature of $+7°$ to $+10°$ C.

Accordingly, another particular characteristic of the invention comprises assuring that when the cooking value been attained, the pH, the $rH_2$ and the AW ratio of the product correspond to a point of the inhibition zone stabilized at a temperature $+7°$ C. to $+10°$ C., which permits long-term preservation under typical industrial conditions and is suitable for the periods of time most recently fixed by commercial constraints for sale limit dates.

Thus, the present invention itself relates to a method for determining the pasteurization value of a cooked dish comprising one or more ingredients, which method is characterized in that it includes the following steps:

a) the pH of the cooked dish is determined;

b) the oxidoreduction potential E of the cooked dish is determined;

c) the $rH_2$ of the cooked dish is calculated, using Nernst's formula, $rH_2 = 2\text{pH} + 33.33\,E$;

d) the quality of the cooked dish, whether reductive, neutral or oxidative, is determined;

e) the position of the cooked dish, located by its pH and $rH^2$ coordinates, is determined with respect to the curves $rH_2 = f(pH)$; and f) the pasteurization value is determined from the results of steps d) and e).

A cooked dish generally includes a main ingredient, which may be meat or fish, vegetables or the equivalent, and a sauce. As a result, the pH of such a cooked dish is determined by measuring the pH of the main ingredient or pH (1), the pH of the vegetables, pH (2), and the pH of the sauce, pH (3), and applying the following ratio:

$$pH = \frac{pH = 2\,pH\,(1) + pH\,(2) + pH\,(3)}{4}.$$

Similarly, to determine the oxidoreduction potential E of the cooked dish, that of the main ingredient, E (1), that of the vegetables, E (2), and that of the sauce, E (3), are measured, and the following ratio is applied:

$$E = \frac{2\,E\,(1) + E\,(2) + E\,(3)}{4}.$$

The cooked dish is considered to be reductive if its $rH_2$ is less than that determined by the ratio (1), $rH_2 = -0.21692\,pH + 15.85162$, where pH is the pH of the cooked dish as determined in step a).

The cooked dish is considered to be oxidative if its $rH_2$ is greater than that determined by the ratio (2), $= -0.15267\,pH + 17.556$, where pH is the pH of the cooked dish as determined in step a).

The cooked dish is considered to be neutral if its $rH_2$ is between the values obtained from ratios (1) and (2).

In step d), one determines the position of the cooked dish located by its coordinates pH, $rH_2$ with respect to the curves $rH_2 = f(pH)$ based on the ratio $= 4.61\,pH + (4.6 + 0.031064)\,K - 13.4$.

Knowing on the one hand the reductive, neutral or oxidative quality of the cooked disk, and on the other hand the position of the cooked dish with respect to the curves, the pasteurization value to be obtained for this cooked dish in order that it will remain wholesome for a long preservation period is easily determined.

The ensuing description, which is solely by way of example, will be made in conjunction with the drawing.

BRIEF DESCRIPTION OF THE DRAWING

The single drawing figure represents curves $rH_2 = f(pH)$ determined on the basis of experimental results.

DESCRIPTION OF THE PREFERRED EMBODIMENT

Figure 1:
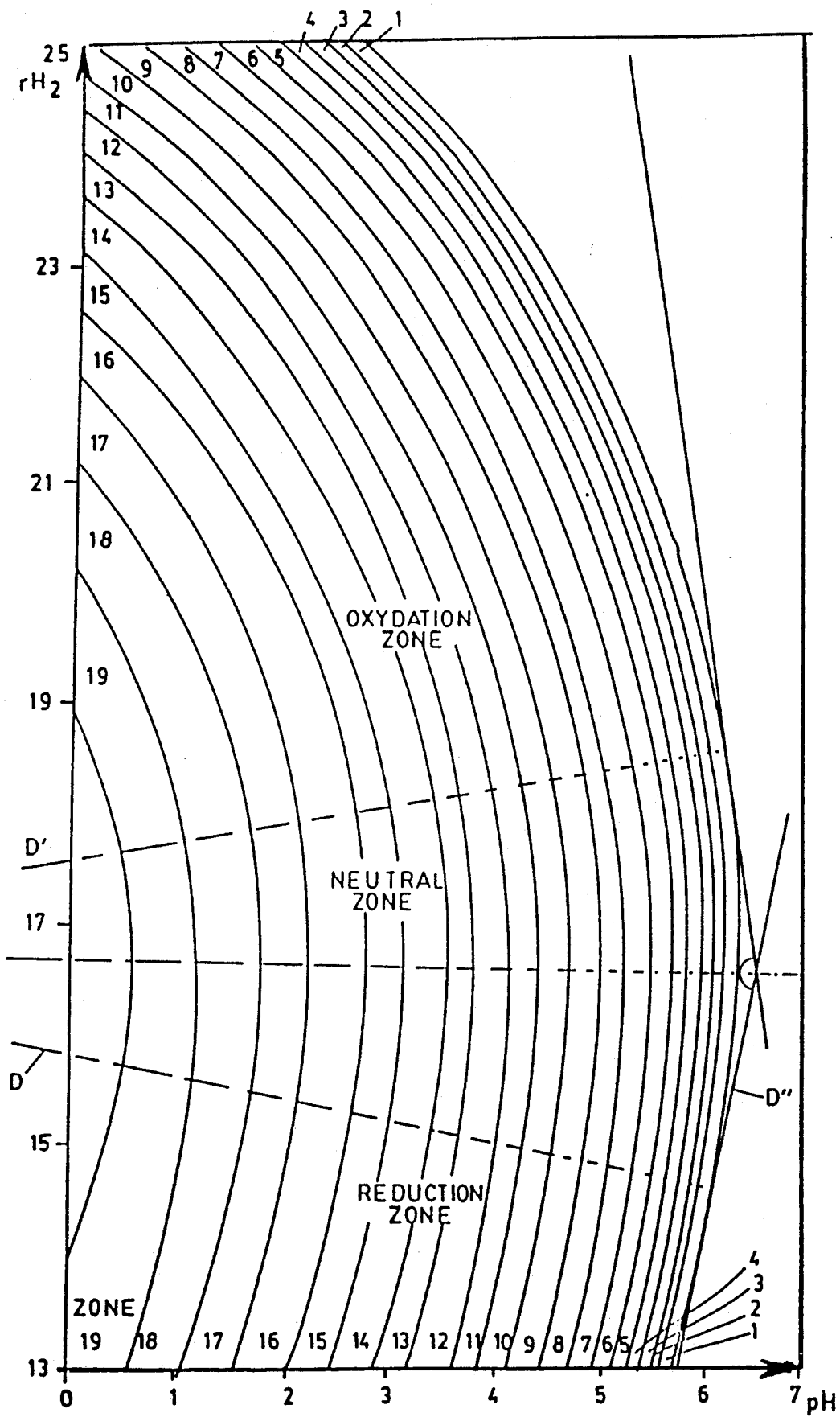

As noted above, the method according to the present above must permit subjecting a food product to minimum heating in terms of both duration and temperature, while guaranteeing the destruction of vegetative forms and hence guaranteeing long-term preservation of this product, thus processed, at above-zero cold.

In the course of the developing cooking recipe or the freshly-cooked dish, that is, one that has not again undergone a supply of a quantity of heat, the pH and the potential for oxidoreduction of the ingredients are measured directly. Each of them contributes a pH value and $rH_2$ value to the composition of the food product or cooked dish that participates in these values of the final dish. Thus fruit juices are acidic and slightly reductive; similarly, wines and in particular white wines are acidic and reductive. Contrarily, water is not very reductive.

The association of these two criteria, pH and $rH_2$, make it possible to locate each ingredient, that is, each primary food material, on a pH-$rH_2$ graph: The ingredients can then be selected with respect to the preferential zones to minimize development of microorganisms that are prejudicial to the quality and/or preservation of the final product.

Thus it is known that at a pH of less than 4.5, food microorganisms and in particular bacteria cannot grow; the maximum development takes place at pH values approximately between 6.5 and 7.

In the agricultural food, or agri-food, industry, generally one seeks to locate the food product in a pH zone less than 5.5. However, this tendency to acidification does not in any way take into account another factor that is indispensible to the development of microorganisms, and in particular bacteria: the potential for oxidoreduction. This is an essential element for the development of bacteria; in fact, it is a condition of the growth of vegetative forms and the germination of spores. For example, strictly aerobic bacteria, that is, those that develop only in the presence of oxygen, do not develop except at a potential for oxidoreduction, or an elevated redox potential. Contrarily, anaerobic bacteria, that is, those that develop without the presence of oxygen, multiply when the redox potential is negative.

In order to develop, Clostridium botulinum, a highly dangerous bacterium that must necessarily be inhibited and preferably eliminated in the preparation of cooked dishes, in particular, requires a lower redox potential, as the pH is low.

The theory explained above will enable for one skilled in the art to better understand the method according to the invention, which, however, does not represent any limitation of this present invention. Although this theory has long been known, it has never been applied in the agri-food field until now.

As has been noted above, one of the objects of the present invention is to furnish a method with which the initial products, and hence the final cooked dish, can be located within a pH or $rH_2$ zone in which all development of microorganisms is inhibited; as a consequence, a cooked dish of this kind needs to undergo only a slight thermal treatment to eliminate living microorganisms, since the sporulated forms have been inhibited by the physical-chemical characteristics of the product itself.

To this end, the pH and the oxidoreduction potential of each food product that is an ingredient in the cooked dish to be made are measured directly.

The pH is measured using conventional pH electrodes and by the usual testing protocols for measuring the pH of liquid, semisolid and solid foods. When several constituent elements of one ingredient or food have different pH values from one another, it is assumed that the pH of this ingredient or food is the highest pH measured.

For the $rH_2$, a standard apparatus is used to measure the oxidoreduction potential: the measured value, $E_m$, which is the oxidoreduction potential, must be corrected by the addition of the potential of the reference electrode. The value E thus calculated makes it possible to determine the value of $rH_2$, by Nernst's formula as given below. It gives an indication of the activity of hydrogen ions on the components of the environment; it has an influence on the chemical and biochemical reactions and consequently on the microorganisms.

In other words, $rH_2$ defines the electronic potential for a given pH; hence it is calculated from the ionic potential pH and the oxidoreduction potential E, using Nernst's formula:

$$rH_2 = 2pH + 33.33E$$

From this equation, it can be found that for the same value of $rH_2$, the lower the pH (or in other words the more acidic), the more E increases, and the higher the pH (or the more basic), the more E decreases. In an acidic environment, the cathodic polarization will be less and the environment will be poorer in electrons; for an alkaline environment, the cathodic polarization will be stronger and the environment will be richer in electrons.

The method according to the present invention accordingly comprises, initially, measuring the pH and the oxidoreduction potential and then determining the $rH_2$ from Nernst's formula. It is then possible to locate the measured product on a pH-$rH_2$ diagram and to determine whether it will have a tendency to be a favorable medium for bacterial proliferation. As a function of this position on the diagram, the final product must undergo a variably major heat treatment, after optimal modification of its physical-chemical characteristics.

To this end, the method of to the present invention accordingly includes the following steps:

a) the pH of the cooked dish is determined;

b) the oxidoreduction potential E of the cooked dish is determined;

c) the $rH_2$ of the cooked dish is calculated, using Nernst's formula, $rH_2 = 2\ pH + 33.33\ E$;

d) the quality of the cooked dish, whether reductive, neutral or oxidative, is determined;

e) the position of the cooked dish, located by its pH and $rH_2$ coordinates, is determined with respect to the curves $rH_2 = f(pH)$; and f) the pasteurization value is determined from the results of steps d) and e).

Thus as has already been said, a cooked dish generally includes several ingredients, which can be classified in three categories: a main ingredient, which is either meat or fish, vegetables, which includes not only vegetables in the strict sense but also foods such as rice, pasta, etc., and a sauce.

Thus to determine the pH and the the oxidoreduction potential E of the cooked dish, those values are measured in each category: pH (1) and E (1) of the main ingredient, pH (2) and E (2) of the vegetables, and pH (3) and E (3) of the sauce, and the following ratio is applied:

$$pH = \frac{2\ pH\ (1) + pH\ (2) + pH\ (3)}{4}$$

$$E = \frac{2\ E\ (1) + E\ (2) + E\ (3)}{4}.$$

The cooked dish is considered to be reductive if its $rH_2$ is less than that determined by the ratio (1), $rH_2 = -0.21692\ pH + 15.8162$, where pH is the pH of the cooked dish as determined in step a).

Ratio (1) is in fact the equation for the straight line D in FIG. 1, which is a graph of the curves $rH_2 = f(pH)$. Thus as one skilled in the art will understand, these curves have been plotted from a series of test results in the course of which various pH and $rH_2$ values have been measured for culture media appropriate for the development of the various microorganisms encountered in agri-food and for a great number of ingredients.

If the point of the coordinates (pH, $rH_2$) as determined by steps a) and b) is located under this straight line D, then the cooked dish is considered reductive; in that case, the pasteurization value will be relatively low, because the other actors can be influenced (pH, $rH_2$ especially). Contrarily, if this point is located above the straight line D', the pasteurization value must be higher, for a given pH, compared with a cooked dish considered to be reductive. This is explained below.

The fact that the zone in which the point representing the ingredient, and the position of this point with respect to the curves, are known makes it possible to determine the quantity of heat to supply in order that this ingredient will be preserved for a long period of time. If the point is located in an unfavorable zone, then modifying the physical-chemical conditions (that is, the receipe and/or the ingredients) will make it possible on the one hand to improve the quality of preservation and on the other hand to reduce the quantity of heat necessary; this makes it possible to assure better taste quality of the final product.

The equations of the straight lines D and D' are as follows, respectively:

(D) $rH_2 = 0.21692\ pH + 15.85162$     (1)

(D') $rH_2 = 0.15267\ pH + 17.556$     (2)

For calculating the position of the point with respect to the curves, the distance from this point with respect to the perpendicular (D'') to the straight line (D) is calculated:

(D'') $rH_2 = 4.61\ pH + (4.61 + 0.031064)K - 13.4$     (3)

The coefficient K is an exponential coefficient determining the ordinate at the origin of the nomograph in the drawing in FIG. 1; it is a function of the number of test curves carried out to determine the position of the point corresponding to the product treated. This coefficient K may be determined from the following equation:

$$K = 0.1\ (1 + e^{n/10})$$

The coefficient is then determined for each food product.

As shown in the drawing, the curves $rH_2 = f(pH)$ have been plotted for values of pH between 0 and 5.9, such that 20 intervals are defined. One pasteurization value corresponds to each interval.

Once the location of the point of the final product is determined, which in a first approximation represents a summation of the points relating to the various ingredients involved in the composition of the final product, the pasteurization value necessary to assure good preservation of this product is known.

Once the food product has been made, that is, once the various ingredients have been combined, they are packed in a hermetically sealed package capable of withstanding a temperature on the order of 100°. Then the entire assembly is subjected to the heat treatment ascertained, such as to obtain the pasteurization value in the most appropriate manner.

Once this pasteurization value is attained, abrupt chilling of the product is performed: a temperature of +10° at the center must be obtained within a maximum of 30 minutes. The product can then be preserved at above-zero cold (+5° C.) for more than at least 40 days.

In order to better realize the benefits of the invention as well as its advantages, described below are two examples.

EXAMPLE I

This example relates to the preparation of a fish with a very delicate meat, the Saint-Pierre, together with sliced vegetables bathed in a fresh cream sauce, butter and a white champagne called a champagne sauce which is very delicate for preservation and storage. For this preparation, the following steps are employed:

Step A: One first determines the pH of the food items employed. One measures separately the pH of each constituent, namely, the fish, vegetables and sauce as follows:
fish pH (1): 6.3
vegetables: pH (2): 4.75
sauce: pH (3): 5.86

The pH of the dish is thus 5.8 by application of the formula $$pH = \frac{2 pH (1) + pH (2) + pH (3)}{4}.$$

Step B: The oxido-reduction potential E of the cooked dish is determined. To this end, one measures separately the oxido-reduction potentials of each ingredient as follows:
fish: E (1)=0.218
vegetables: E (2)=0.324
sauce: E (3)=0.264

The oxido-reduction potential E of the dish is determined by the equation in the formula $$E = \frac{2 E (1) + E (2) + E (3)}{4}.$$

which renders a result of E=0.256.

Step C: The value of $rH_2$ of the cooked dish is determined by the Nernst formula and is equal to 20.13.

Step D: From the equation 1, one obtains a value for $rH_2$ of 14.59 and by application of the formula of the equation 2, one obtains an $rH_2$ of 16.67.

The $rH_2$ of the cooked dish, being 20.13, is still above that calculated by equation 2. Thus, the cooked plate according to this example is still oxidative.

Step E: The point representing the cooked plate on FIG. 1 is situated between the curves 1 and 2 which determines the pasteurization value of between 31 and 34.

In order to effect pasteurization as determined above, one is able to follow one or the other of two of the following methods.

The simpler method concerns the technology of cooked dishes. Since the apparatus, such as an industrial oven, permits the automatic calculation of the pasteurization value, it is sufficient to set an industrial oven with the desired pasteurization value in order to obtain an effective treatment.

The other method is more of a handy craft, makes use of very simple tools such as a small brazing heater, thermometers, boiling water or the like. The operation of such devices is familiar to a skilled cook and does not require the care that a large industrial production contemplates. It is, however, based on the calculation of the pasteurization points accumulated through thermal treatments. These are measured with the aid of thermal probes which monitor the temperature at the core of the food.

The pasteurization is immediately followed by a quick cooling of the cooked preparation. In this example, the temperature at the heart of the fish will have risen from 17° C. (temperature at the outset) to 77.3° C. (maximum temperature) with 18 minutes of immersion in a bath at 100° C. (that is, 60.3° C. change in 18 minutes), the cooling having taken place after 16 minutes of immersion in the boiling water.

This simple operation permits to accumulate 30 points of pasteurization for the cooked product which is then able to be stocked cold for several weeks. This treatment suitably permits to preserve the meat of the fish and the sauce for a maximum storage with a presentation of high quality. Moreover, the organoleptic and nutritional qualities are maintained at their optimum as well as the sanitary qualities which will remain within the required boundaries.

EXAMPLE II

This example involves the preparation of a cooked dish having as a principle ingredient chicken, delicate meat, and includes mushrooms with a sauce identical to that of Example I.

Step A: Determination of the pH. One measures separately the pH of each ingredient as follows:
precooked chicken: pH (1): 6.3
mushrooms: pH (2): 5.4
sauce: pH (3): 5.8

The pH of the dish is thus 5.95 using the formula set forth above.

Step B: Determination of the oxido-reduction potential E.
precooked chicken: E (1)=0.216
mushrooms: E (2)=0.198
sauce: E (3)=0.267

The oxido-reduction potential E of the cooked disk is then 0.224.

Step C: The value of $rH_2$ of the cooked plate determined by the Nernst formula is equal to 19.4.

Step D: From equation 1, one obtains a value for $rH_2$ of 14.56 and by the application of equation (2) one obtains a value for $rH_2$ of 16.65. The value of $rH_2$ of the cooked plate according to this example being 19.4, it is still above that calculated by equation (2) and the plate is thus situated in the oxidative zone.

Step E: the point representing the cooked plate on FIG. 1 is situated between the curves 1 and 2 which determines a pasteurization value of between 31 and 34. In this example, the precooking of the meat ought to take into account a pasteurization of 20 points, this corresponding to the preceding example from which is deducted a pasteurization value of from 11 to 14 points.

Having described the invention, it will be apparent to those skilled in the art that various modifications may be made thereto without departing from the spirit of the invention as defined in the appended claims.

What is claimed is:

1. A process for preparing a dish of cooked foodstuff product which process permits long-term preservation of the product without impairing its organoleptic qualities and characteristics, and wherein said product has a preselected cooking value determined, at least in part, by the desired appearance and taste of the product, which process comprises:

a) measuring the pH of the product;
b) determining the oxidoreduction potential E of the product;
c) calculating the $rH_2$ value of the product using Nernst's formula. $rH_2 = 2\ pH + 33.33\ E$;
d) determining whether said cooked dish is reductive, neutral or oxidative where the pH and $rH_2$ have been determined by reference to the position of said cooked dish relative to a curve $rH_2 = f(pH)$ of the drawing;
e) determining a pasteurization value from the results of step (d) to determine a cooking temperature range that is below a 100° C. for the product by varying at least one of the pH of the product while maintaining the pH above 4.5 and the ratio of free water to total water of the product while maintaining said cooking temperature range in excess of the minimum lethal temperature necessary to destroy Streptococci D and subjecting the product to a heat treatment for a time selected to attain but not exceed said cooking value and to at least attain said pasteurization value, the heat treatment being effective to raise the temperature of the product to within said predetermined cooking temperature range, and thereafter lowering the temperature of the product to cool the product to a temperature above 0° C.

2. The process as claimed in claim 1 including the step of monitoring the core temperature of the product and raising the core temperature of the product gradually to permit any sporulating microorganisms present to germinate to facilitate destruction of such microorganisms upon completion of the step of subjecting the product to a heat treatment.

3. The process as claimed in claim 1 wherein the step of heat treatment is performed in one of a water bath and in an oven, the heat treatment being such that there is a gradual rise of temperature from a minimum temperature to a maximum temperature, which minimum temperature and maximum temperatures are chosen in light of the rheological characteristics of the food stuff product and where the maximum temperature is always below a 100° C. to prevent destruction of the appearance of the product.

4. The process as claimed in claim 1 wherein the product comprises a solid phase and a sauce and wherein the pH of the product is measured in the solid-phase and in the sauce and the higher pH of these two is adopted to determined the pasteurization value.

* * * * *